United States Patent [19]
Bowen et al.

[11] Patent Number: 5,994,243
[45] Date of Patent: Nov. 30, 1999

[54] METHOD FOR FORMING LOW PERMEABILITY AIRBAG FABRIC

[75] Inventors: Derek L. Bowen; Charles L. Bower, both of LaGrange, Ga.

[73] Assignee: Milliken & Company, Spartanburg, S.C.

[21] Appl. No.: 09/228,339

[22] Filed: Jan. 11, 1999

Related U.S. Application Data

[62] Division of application No. 08/677,433, Jul. 2, 1996, Pat. No. 5,858,886.

[51] Int. Cl.$^6$ .............................. D03D 1/02; D03D 25/00; B60R 21/16
[52] U.S. Cl. ...................... 442/203; 442/181; 280/728.1; 139/389; 139/420 A; 139/420 R
[58] Field of Search ..................................... 442/203, 181; 280/728.1; 139/389, 420 A, 420 R

[56] References Cited

U.S. PATENT DOCUMENTS 5,482,317  1/1996  Nelsen et al. ........................ 280/743.1

*Primary Examiner*—Terrel Morris
*Assistant Examiner*—John J. Guarriello
*Attorney, Agent, or Firm*—Terry T. Moyer; Earle R. Marden

[57] ABSTRACT

A low permeability fabric and airbag formed therefrom suitable for use in protection of a vehicle occupant in the event of a collision are provided. In particular, the present invention provides an uncoated fabric preferably formed from a substantially symmetrical weave construction of nonsized nylon yarn at a fabric cover factor of not greater than 0.85. The fabric is characterized by an air permeability of not greater than 0.8 cubic feet of air per minute per square foot of fabric at a pressure drop of 125 Pa (0.5 inches of water) across the fabric. a method for formation of the fabric is also provided.

1 Claim, No Drawings

METHOD FOR FORMING LOW PERMEABILITY AIRBAG FABRIC

This is a divisional of U.S. Ser. No. 08/677,433 filed Jul. 2, 1996, now U.S. Pat. No. 5,858,886.

FIELD OF THE INVENTION

The present invention relates generally to the construction of fabrics for use in airbag applications within a restraining system for protection of vehicle occupants during collisions and more particularly to fabrics and airbags formed therefrom having low air permeability characteristics achievable without the need for calendering or other physical deformation processes.

BACKGROUND OF THE INVENTION

For many uses of industrial fabrics, it is critical for such fabrics to possess a controlled and limited air permeability. This is particularly true of fabrics for use in airbags since permeability affects the ability of the bag to inflate in a controlled and consistent manner according to a given design, so as to ensure the effectiveness of the system during a collision event.

Airbag equipment installed on a fixed portion of an automobile, airplane or other passenger vehicle in opposed relation to an occupant therein plays an important roll in the protection against injury to that occupant which may arise due to a collision with a fixed portion of the vehicle body during an accident. As will be appreciated, airbags may be produced in a number of manners and from a number of different materials. However, airbags are typically formed, at least in part, from some type of woven textile material. Such textile materials are disclosed for example in U.S. Pat. No. 5,508,073 to Krummheuer et al. issued Apr. 16, 1996; U.S. Pat. No. 5,503,197 to Bower et al. issued Apr. 2, 1996; U.S. Pat. No. 5,356,680 to Krummheuer et al. issued Oct. 18, 1994; U.S. Pat. No. 5,421,378 to Bower et al. issued Mar. 30, 1994; U.S. Pat. No. 5,277,230 to Sollars, Jr. issued Jan. 11, 1994; U.S. Pat. No. 5,259,645 to Hirabayashi et al. issued Nov. 9, 1993; U.S. Pat. No. 5,110,666 to Menzel, et al. issued May 5, 1992; U.S. Pat. No. 5,093,163 to Krummheauer, et al. issued March 1992; U.S. Pat. No. 5,073,418 to Thornton et al. issued Dec. 17, 1991; U.S. Pat. No. 5,011,183 to Thornton et al. issued Apr. 30, 1991; U.S. Pat. No. 4,977,016 to Thornton et al. issued Dec. 11, 1990; U.S. Pat. No. 4,921,735 to Bloch issued May 1, 1990; and U.S. Pat. No. 3,814,141 to Iribe et al. issued Jun. 4, 1974 (all specifically incorporated herein by reference).

As will be appreciated, very low air permeabilities may be achieved through the use of coatings applied to a fabric construction. However, the use of such coatings presents a disadvantage from both an economic as well as a functional standpoint. Specifically, the use of coatings may add substantial cost to the finished product while at the same time adding bulk to the finished product which translates to a greater folded volume of the final airbag configuration thereby requiring a greater allocation of space within the vehicle deployment system.

In the attempt to avoid the use of coatings while at the same achieving low and controlled air permeabilities, a number of approaches have been taken. The above-referenced U.S. patents to Thornton et al. and Bloch propose the achievement of low permeability characteristics through the use of mechanical deformation processes, in particular calendering, to close the voids at the interstices between overlapping yarns in the fabric so as to reduce permeability to a desired level. While such calendering operations may reduce permeability, this operation may also have the affect of increasing cost while yielding undesirable changes to the flexibility and feel of the fabrics.

In another approach, fabrics have been produced using very tight weave constructions thereby packing the yarns so tightly together that permeability is reduced to a desired level. In some instances, it is necessary to achieve permeabilities in the range of about 1 cubic foot per minute per square foot of fabric or less as measured at a pressure differential of 125 Pa (0.5 inches of water) in order to meet certain automotive specifications. In order to achieve such levels through tight weave constructions, it has generally been thought necessary to pack the yarns at a density to achieve a fabric cover factor of greater than 0.85. One such known construction is a 420 denier nylon fabric having 57 threads per inch in the warp and 53 threads per inch in the fill sold under the trade designation MICROPERM™ by Milliken & Company in LaGrange, Ga.

As will be appreciated by those of skill in the art, the term "fabric cover factor" is used to define the packing factor of yarns in a fabric construction in relation to the maximum number of threads which can lay side by side. The maximum number of threads per inch is defined by the following formula:

1. Maximum threads per inch=(fiber specific cover factor)×(the square root of the cotton count).

Cotton count is defined by the formula:

2. Cotton count=5315/denier.

The fiber specific cover factors have been determined over the years by researchers. By way of example, the generally accepted cover factor for nylon is 24.4.

As will be appreciated, by using formulas 1 and 2 above, one can readily determine the maximum number of threads per inch which could be placed side by side for a given denier and fiber type. One can then determine a relative cover factor based on the actual weave density in a given fabric by the following relations:

3. Warp cover factor=threads per inch in the warp divided by maximum threads per inch.

4. Fill cover factor=threads per inch in the fill divided by maximum threads per inch.

5. Fabric cover factor=(warp cover factor+fill cover factor)−(warp cover factor×fill cover factor).

By way of illustration, a 420 denier nylon fabric as described above having 57 threads per inch in the warp and 53 threads per inch in the fill has a warp cover factor of 0.66, a fill cover factor 0.61 and a fabric cover factor of 0.866.

While low permeability fabrics having cover factors greater than 0.85 have been available, the formation thereof has required a relatively high number of threads per inch which necessarily increases the raw material costs. Moreover, it is generally understood that in order to achieve such very high cover factors, weaving must be carried out by mechanical (i.e. Rapier) weaving processes rather than by water-jet insertion or other means which are substantially faster and less expensive.

Notwithstanding the achievements which have been made in reducing air permeability to this point, it is anticipated that fabrics of even lower permeabilities achieved without the need for expensive and complex calendering operations or high cover factor configurations represent a desirable and useful advancement over the present art. The fabrics of the present invention may be woven on efficient water-jet weaving machines due to their relatively low cover factor requirement and exhibit desirable low permeability characteristics without requiring the need for complex coatings or calendering operations and thereby represent a useful advancement over the present art.

SUMMARY OF THE INVENTION

In light of the foregoing, it is a general object of the present invention to provide an airbag fabric and airbag formed therefrom formed from an uncoated tightly woven fabric characterized by an air permeability of not greater than about 0.8 cubic feet of air per minute per square foot of fabric at a pressure drop of 0.5 inches of water and a fabric cover factor of not greater than 0.85 wherein such permeability is achieved prior to any calendering operation.

BRIEF DESCRIPTION OF PREFERRED EMBODIMENTS

The fabric of the present invention is preferably formed by water-jet weaving operations as illustrated and described in U.S. Pat. No. 5,503,197 to Bower et al., the teachings of which have been incorporated herein by reference. In the preferred practice, the weaving operation will be carried out using nonsized polyamide filament yarns in both the warp and the fill directions. By the term "nonsized" is meant that no chemical sizing compound such as polyacrylic acid, polyvinyl alcohol, polystyrene, polyacetates, starch, gelatin, oil or wax is applied to enhance coherency to the filaments. A particularly preferred polyamide fiber is nylon 6.6. While polyamide filament yarns may be preferred, it is contemplated that other synthetic fibers such as polyester and the like may also be used.

In order to achieve balanced permeability and performance characteristics, the fabrics of the present invention are preferably woven with a substantially symmetrical weave construction such as a plain weave or basket weave as are well known to those of skill in the art. In one potentially preferred configuration, the fabric is woven with a loom state weave density of approximately 41 threads per inch in the warp direction and 41 threads per inch in the fill direction using yarn having a linear density of approximately 630 denier. Such fabric will thereafter be finished in accordance with the washing and drying processes as described below to yield a final configuration of about 42 threads per inch in the warp direction by 42 threads per inch in the fill direction thereby having a fabric cover factor of 0.83.

In another potentially preferred configuration, a filament yarn having a linear density of approximately 420 denier is woven in a substantially symmetrical plain weave configuration to yield a loom state weave density of approximately 50 threads per inch in the warp direction by 50 threads per inch in the fill direction. Subsequent to washing and drying, such fabric will thereafter have a weave density of approximately 51 threads per inch in the warp direction and 51 threads per inch in the fill direction thereby having a fabric cover factor of 0.83.

In a third potentially preferred configuration, polyamide filament yarn having a linear density of approximately 840 denier is woven in a substantially symmetrical plain weave configuration to yield a loom state fabric having a weave density of approximately 35 threads per inch in the warp direction and 34 threads per inch in the fill direction. Subsequent to finishing as described below, the finished fabric construction will be about 36 threads per inch in the warp direction by 35 threads per inch in the fill direction thereby having a fabric cover factor of 0.82.

Another potentially preferred embodiment of the fabric of the invention is a symmetrical plain weave 315 denier nylon fabric having a weave density of 60 threads per inch in the warp direction and 60 threads per inch in the fill direction thereby having a fabric cover factor of 0.84.

Yet another potentially preferred embodiment of the fabric of the present invention is a plain weave formed from 210 denier nylon at a weave density of 72 threads per inch in the warp direction and 72 threads per inch in the fill direction thereby having a fabric cover factor of 0.83.

As previously stated, the potentially preferred embodiment of the fabric of the present invention is formed from "nonsized" polyamide filament yarn. Such yarn is preferably a single ply yarn having a relatively high number of individual low denier filaments. In the potentially preferred configuration such filaments have linear densities of about 6 denier per filament or less and more preferably linear densities of about 3 denier per filament or less.

While the above configurations may represent the most preferred embodiments, by way of example only and not limitation, other potentially desirable weave configurations and cover factors are as set forth in TABLE 1.

TABLE 1

| Finished Weave Configuration (Warp × Fill) Nylon 6.6 | Fabric Cover Factor |
|---|---|
| 420 denier 49 × 49 | 0.810 |
| 420 denier 53 × 53 | 0.848 |
| 630 denier 41 × 41 | 0.822 |
| 630 denier 43 × 43 | 0.845 |
| 840 denier 32 × 32 | 0.771 |
| 840 denier 33 × 33 | 0.786 |
| 840 denier 34 × 34 | 0.801 |
| 840 denier 35 × 35 | 0.815 |
| 840 denier 36 × 36 | 0.829 |

Following weaving, the fabric of the present invention is preferably subjected to treatment in an aqueous bath at a temperature of at least 160° F. and preferably about 210° F. or greater so as to promote maximum fabric shrinkage as may be available following loom state formation. In the potentially preferred practice, this washing operation will take place in a series of washbox stations such as are well known to those of skill in the art using water with no chemical additives therein. Following the last stage of such washing operation, excess water is preferably removed by means of vacuums, nip rollers or the like as are well known to those in the art.

Following the washing operation, the fabric according to the invention is subjected to a relatively low temperature drying operation. In the preferred practice, the fabric is first subjected to a predrying operation carried out at a temperature of about 170° F. Such predrying takes place in a zone along the finishing line about 10 yards in length with the fabric traveling at approximately 35 yards per minute such that the predrying operation is completed in about 17 seconds. Subsequent to this predrying operation, the fabric of the present invention is thereafter preferably subjected to a low temperature drying operation carried out at a temperature which is just sufficient to drive off remaining moisture without substantially altering the packing and yarn bulk characteristics achieved in the previous weaving and washing operations. In the preferred practice, the fabric will be dried at a temperature of about 250° F. or less for a period of about 40 seconds. In a more preferred practice, the fabric will be dried at a temperature of about 210° F. or less for a period of 46 seconds and in a potentially most preferred practice, the fabric will be dried at a temperature of about 170° F. or less for a period of 56 seconds. All drying operations are preferably carried out on a tenter. On leaving the tenter, the fabric is cooled down gradually to room temperature.

In order to more fully illustrate the concept of the subject invention, the following examples are provided. However, it is to be understood that such examples are not to be construed as unduly limiting the scope of the invention since modifications may be made and other embodiments of the principals of the invention will no doubt occur to those skilled in the art to which the invention pertains. Therefore, it is contemplated to cover any such modifications or other embodiments as incorporate the features of the invention defined and limited only by the true spirit and scope of the claims herein.

EXAMPLE 1

A 630 denier single ply nonsized polyamide filament yarn with 105 filaments per yarn was woven in plain weave on a water-jet loom at a loom state weave density of 41 threads per inch in the warp (plus or minus 1 thread per inch) and 41 threads per inch in the fill (plus or minus 0.5 threads per inch). The thickness of the fabric formed was 15 mils (plus or minus 3 mils). The weight of the loom state fabric was 7.05 ounces per square yard (plus or minus 0.10 ounces per square yard).

The loom state fabric was thereafter passed through six high temperature water wash boxes at a rate of 35 yards per minute such that a residence time in each box of approximately 64 seconds was achieved. The water temperature in each box was 210° F. (plus or minus 5° F.). No scouring chemicals were present in any wash box. A vacuum was used in the final wash box at a level of 6 inches Hg to remove excess water.

The fabric produced was thereafter passed through a nip roll to force out entrained water.

The fabric was thereafter passed through a predryer at a temperature of 175° F. (plus or minus 5° F.) with a residence time of approximately 17 seconds.

The fabric was thereafter passed through a six zone tenter at a rate such that a residence time of approximately 9 seconds was achieved in each zone. In the first two zones, the temperature was set at 165° F. (plus or minus 5° F.). In the four subsequent zones the temperature was set at 160° F. (plus or minus 5° F.).

The fabric was thereafter cooled gradually to room temperature.

The fabric manufactured had a finished weave density of 42×42 and exhibited an air permeability of 0.35 cubic feet per minute per square foot of fabric at a test pressure differential of 125 Pa (0.5 inches of water).

EXAMPLE 2

Example 1 was repeated in all respects except that the yarn had a filament count of 210 filaments per yarn (i.e. 3 denier per filament).

The finished fabric thus manufactured exhibited an air permeability of 0.15 cubic feet per minute per square foot of fabric at a test pressure differential of 125 Pa (0.5 inches of water).

What is claimed is:

1. A process for the manufacture of an airbag fabric having a permeability of not greater than about 0.8 cubic feet of air per minute per square foot of fabric at a pressure differential of 125 Pascals (0.5 inches of water), prior to any calendering operation, the process comprising the steps of:

(a) conveying a plurality of warp yarns substantially free of chemical sizing compounds thereon through a weaving machine;

(b) inserting a plurality of fill yarns with substantially no chemical sizing compounds thereon between said plurality of warp yarns by means of a water jet such that any yarn oils are at least partially removed by said water jet;

(c) beating said plurality of fill yarns into place between said warp yarns such that a loom state fabric is formed;

(d) washing the loom state fabric in a bath at a temperature of about 160° F. to about boiling;

(e) extracting excess liquid from the fabric washed in step "d"; and (f) drying the fabric washed in step "d" at a temperature of about 250° F. or less such that the finished fabric having a fabric cover factor of not greater than 0.85 is produced.

* * * * *